G. W. BARNETT.
HORSE DETACHER.
APPLICATION FILED APR. 28, 1908.
917,523.
Patented Apr. 6, 1909.
3 SHEETS—SHEET 2.
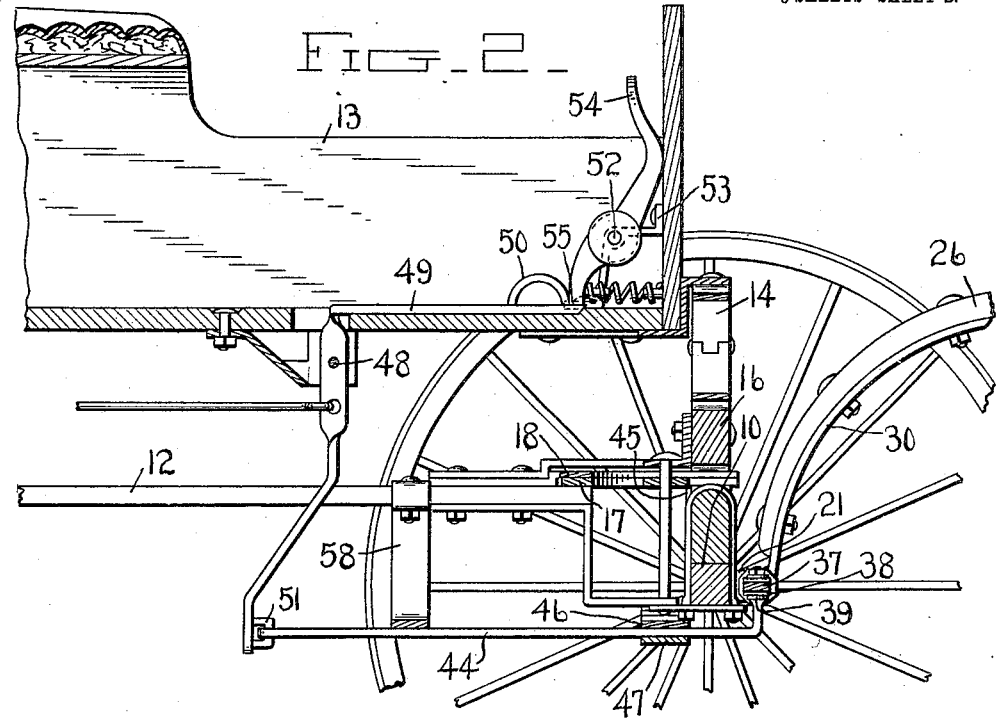
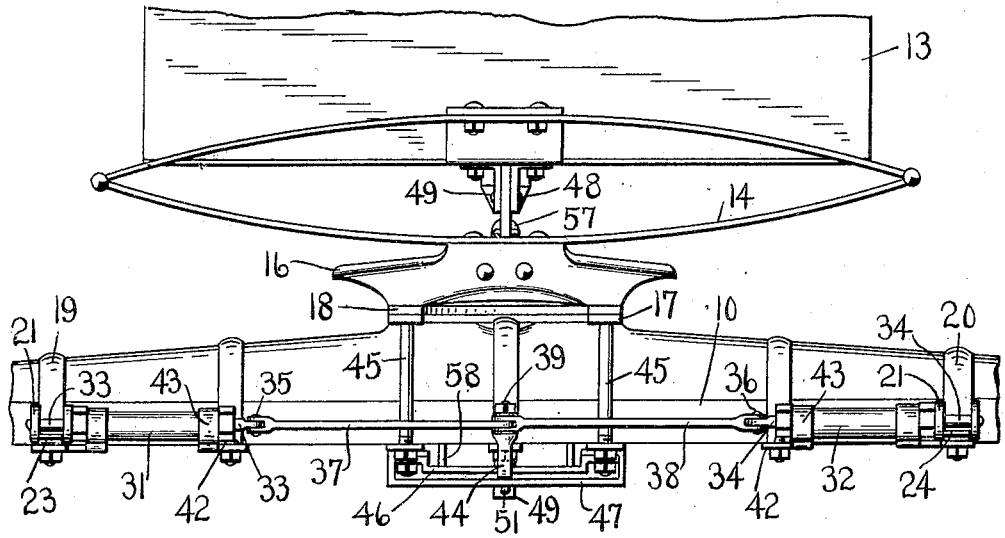
Witnesses
L. B. James
M. F. Miller
Inventor
George W. Barnett
By Chandlee & Chandlee
Attorneys

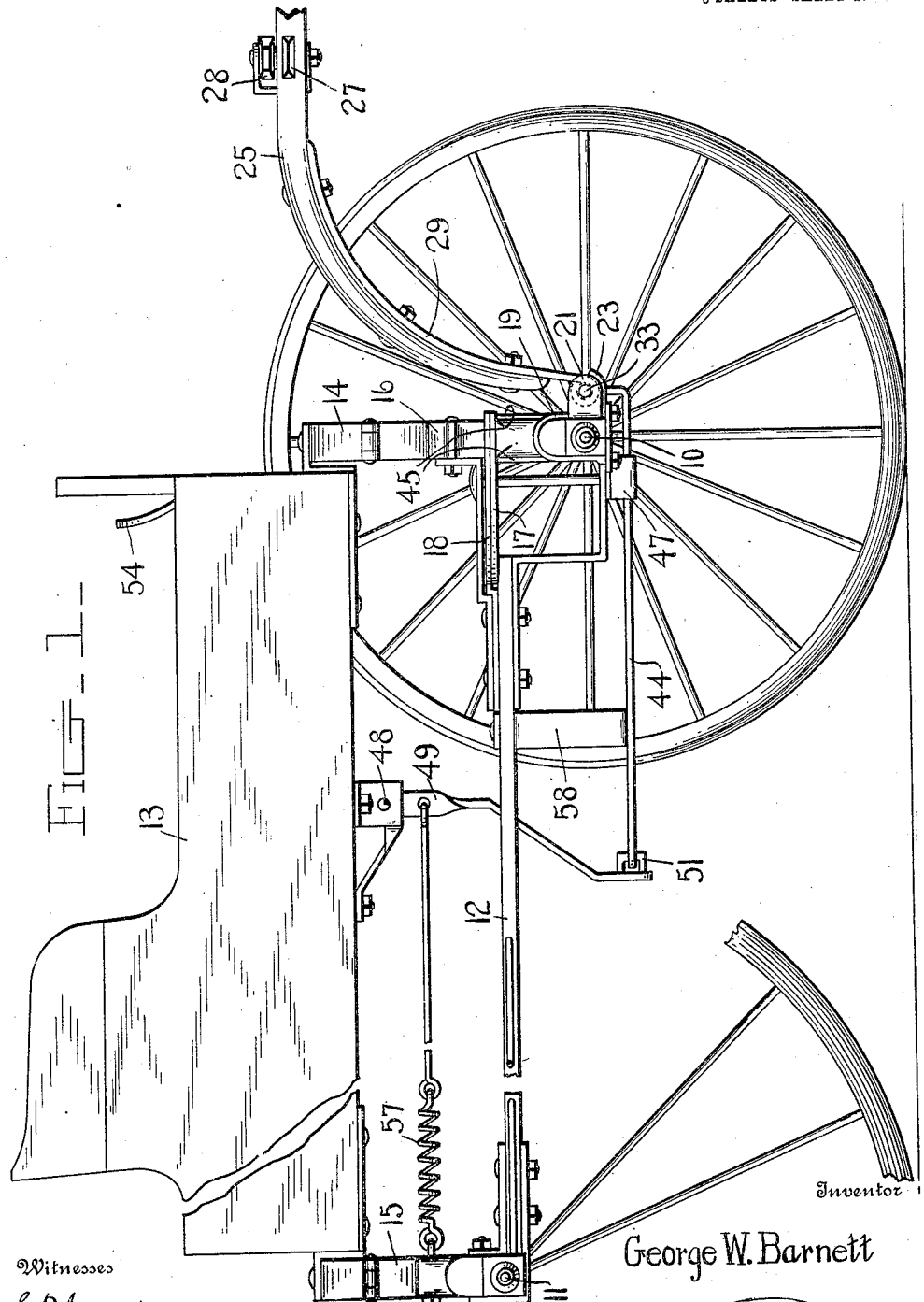

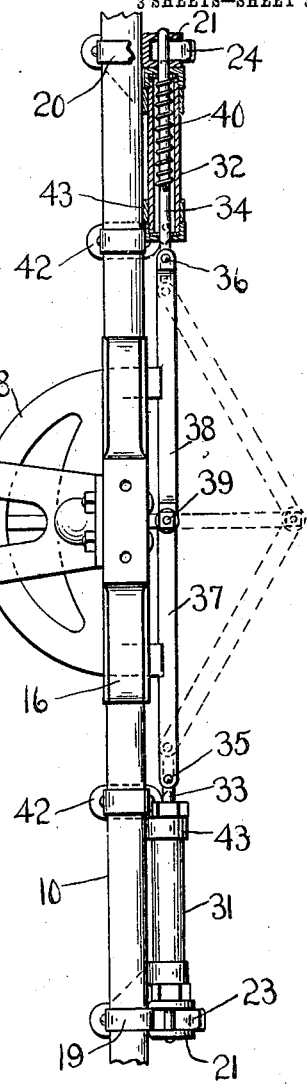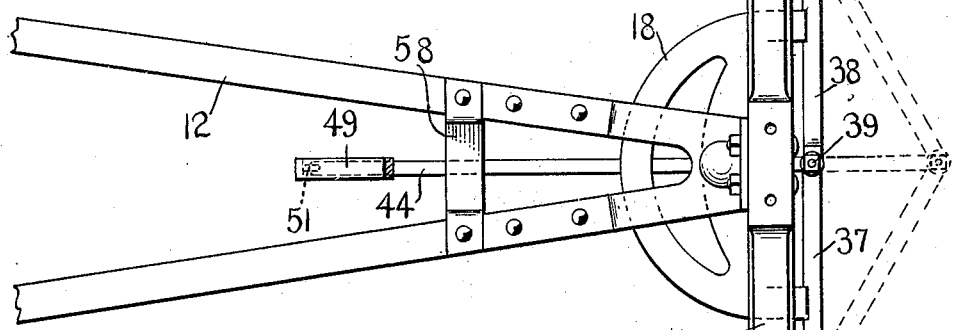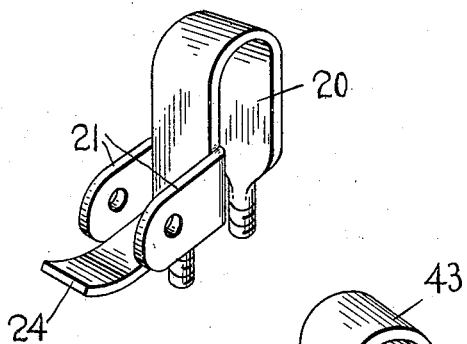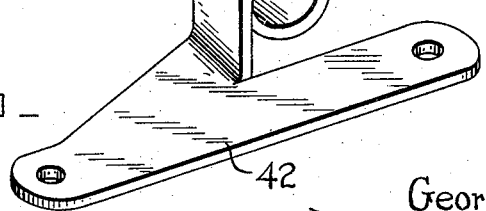

UNITED STATES PATENT OFFICE.

GEORGE W. BARNETT, OF LOUISE, TEXAS.

HORSE-DETACHER.

No. 917,523.  Specification of Letters Patent.  Patented April 6, 1909.

Application filed April 28, 1908. Serial No. 429,693.

*To all whom it may concern:*

Be it known that I, GEORGE W. BARNETT, a citizen of the United States, residing at Louise, in the county of Wharton, State of Texas, have invented certain new and useful Improvements in Horse-Detachers; and I do hereby declare the following to be a full, clear, and exact description of the invention, such as will enable others skilled in the art to which it appertains to make and use the same.

This invention relates to attachments to vehicles for enabling the driver to disconnect the horses in event of their becoming unruly or attempting to run away, and has for one of its objects to simplify and improve the construction of devices of this character.

Another object of the invention is to provide a simply constructed device attachable to any form of vehicle to detach the draft tongue or thills from the vehicle and leave them attached to the animal.

Another object of the invention is to so construct a device of this character that any accidental displacement of the locking mechanism will not cause the releasing mechanism to be operated, thus requiring positive action on the part of the driver to operate the releasing mechanism.

With these and other objects in view the invention consists in a simply constructed locking mechanism between the tongue or thills and the running gear and held yieldably in closed or locked position and releasable only by the positive action of the driver.

The invention further consists in a simply constructed locking mechanism whereby the tongue or thills is detachably coupled to the axle, a releasing mechanism operative by the driver, a safety lock device for holding the releasing mechanism from accidental displacement, and a yieldable safety device which will not cause the operation of the releasing mechanism in event of the accidental release of the locking mechanism, thus requiring releasing mechanism to be positively operated by the driver.

The invention further consists in novel means whereby the releasing mechanism is coupled to the forward axle so that the improved device may be applied to any vehicle without structural change of the latter.

The invention further consists in certain novel features of construction as hereafter shown and described and then specifically pointed out in the claims, and in the drawings illustrative of the preferred embodiment of the invention, Figure 1 is a side elevation of a vehicle with the nigh wheels removed, Fig. 2 is a side elevation with the forward axle, a portion of the running gear, and the body in section, Fig. 3 is a front elevation of the parts shown in Fig. 1, Fig. 4 is a plan view of the forward axle and a portion of the reach element and a portion of the thill structure with the improved attachment applied and partly in section, Fig. 5 is a perspective view of one of the coupling devices attached to the forward axle, and, Fig. 6 is a perspective view of one of the supporting clips for the bolt tubes.

The improved device may be attached to any of the various makes of vehicles, either those employing thills or those employing a draft tongue, and for the purpose of illustration is shown applied to a buggy of the ordinary construction, in which 10 represents the forward axle, 11 the rear axle, 12 the reach element, 13 the body or box, and 14—15 the springs between the opposite ends of the box and the axle, the forward spring having the usual bolster 16 and the fifth wheel members 17—18, all of these parts being of the usual construction.

Connected to the forward axle 10 by clips 19—20 are vertical perforated ears 21 and horizontal resilient plates 23—24, the latter curving upwardly at their outer ends. The thills represented at 25—26 are shown connected by the usual cross bar 27 carrying a whiffle-tree 28, the rear ends of the thills having socket members 29—30 provided with transverse apertures to receive the holding bolts by which they are coupled to the axle, as hereafter explained.

The portions 23—24 of the thill couplings extend forwardly along side the ears 21 and exert a considerable force against the rear ends of the socket members 29—30, so that when the holding bolts are passed through the sockets and likewise through the apertures of the ears 21 the thills will be prevented from rattling, as hereafter explained.

Disposed against the forward face of the axle next to the clips 19—20 are tubular members 31—32 having bolts 33—34 extending therethrough and likewise through the sockets of the thills and through the apertured ears 21 when in normal position. The tubular members are preferably formed of a section of gas piping with threaded caps at the ends, the caps having apertures through which the bolts 33—34 extend at both ends, the inner ends of the bolts being perforated to enable them to be pivoted at 35—36 to the outer ends of jointed bars 37—38, the inner ends of the jointed bars being pivotally connected at 39. The bolts 33—34 are surrounded by coil springs 40 within the tubular members 31—32, and operating to maintain the bolts yieldably in their outward position or in engagement with the thill sockets. By this arrangement it will be obvious that when the bolts 33—34 and the jointed bars 37—38 are in longitudinal alinement, the bolts will be maintained in their outward or engaging position relative to the thill sockets, and retain the thills swingingly coupled to the axle. It will also be obvious that in event of moving the jointed bars forwardly or toward the whiffle-tree bar, the bolts 32—33 will be moved inwardly simultaneously, and thus disconnect the thill sockets, and permit the draft animal to move forward without the vehicle, the object of this arrangement being hereafter described.

The tubular members 31—32 are secured in place by novel forms of clips and one of these clips is shown in perspective in the drawings, and as each of the clips is precisely alike except that they are right and left handed, a description of one will suffice for all. The clips consist of plates 42 having perforations near their ends to receive the threaded ends of U clips of ordinary form which pass over the axle and with nuts on their ends below the plates, each plate having an integral projection 43 extending upwardly and curved around the tubular members 31—32 next to their end caps, the plates 42 and their extensions 43 being of material sufficiently heavy to firmly hold the tubular members in place.

The pivot 39 uniting the inner ends of the jointed rods 37—38 is directed downwardly and thence rearwardly and beneath the vehicle body, as shown. The clips 45 which unite the fifth-wheel member 17 to the forward axle are connected by a longitudinal plate 46 beneath which the rod 44 extends and the clip devices are also connected by another plate 47, which extends beneath the rod 44, and this obviates the danger of the rod 44 dropping in event of its becoming detached from the jointed rods and also to support the rod 44 and prevent any deflection downwardly of the jointed rods.

Pivoted at 48 in the body 13 is a right angled lever 49, the upper portion extending through an aperture in the bottom of the body 13 and thence forwardly and provided with a hand grip 50 near its forward end, and with the lower portion depending below the reach element 12 and provided with a yoke 51 with which the rear end of the rod 44 is movably engaged. By this means it will be obvious that when the portion of the lever 49 carrying the hand grip 50 is in its depressed position the depending portion carrying the yoke 51 will be in its rearward position, and thus hold the jointed rods through the action of the rod 44 in their longitudinally alined position and with the bolts 33—34 in engagement with thill sockets, and then if it is desired to release the thills or the tongue, it is only necessary for the driver to pull upwardly upon the hand grip 50 and thereby force the central portion of the jointed rods forwardly and withdraw the bolts and release the thills or the tongue.

Pivoted at 52 in a bracket 53 within the body 13 is a short lever 54 provided with a notch 55 at its lower end to engage over the free end of the lever 49 adjacent to the hand grip 50, the lever 54 being held with its lower end yieldably in forward position, or in engagement with the lever 49. The lever 54 thus forms an effectual lock device to hold the lever 49 in locked position, and thus likewise maintains the jointed rods 37—38 and the bolts 33—34 in their locked position, and maintain the thills or tongue coupled to the axle.

When it is desired to release the thills or tongue, the driver first draws the upper end of the lever 54 rearwardly and then pulls the upper portion of the lever 49 upwardly by means of the hand grip 50 and thus forcibly releases the thills or tongue.

Connected to the rear axle is a relatively powerful spring 57 with its forward end coupled to the lower portion of the lever 49, the spring 57 being strong enough to maintain the jointed rods and the bolts connected thereby in their locked position relative to the thills or tongue, so that in event of the accidental release of the lever 54, the spring 57 will be powerful enough to prevent the release of the device. The spring 57 is thus a safety appliance which prevents accidental release of the draft animal and is therefore an important adjunct of the device.

The guard element 58 is connected to the bottom of the body 13 and bears upon top of the rod 44, and prevents its upward movement during its operation.

The device is simple in construction, can be readily applied to vehicles of all classes without material change in the structure of the vehicle, and without material changes in the releasing devices.

To apply the improved device to a vehicle it is only necessary to discard the ordinary thill clips and replace them with the thill clips shown, and then connect the guard plates 46—47 to the usual fifth wheel clamp bolts, and attach the bracket which supports the lock device 54, and likewise connect the safety spring 57 to the rear axle, and then connect the guard 58 to the bottom of the reach. These various portions of the improved device, as will be obvious, can be readily adapted without structural change to the different forms and sizes of vehicles, and the attachment can be accomplished in a very short time.

The improved device is equally applicable to the light buggies, carriages of different forms, or to the heaviest vehicles which may require a device of this character.

Suitable packings, preferably of rubber or the like, are arranged within the caps upon the ends of the tubular members 31—32, and operating to prevent the entrance of dust, snow or rain, or other foreign matter, which would interfere with the action of the springs. The packings also prevent the entrance of water, which would be liable to freeze within the tubular member in cold weather. The packings are therefore important features of the invention.

What is claimed, is:—

1. The combination with a vehicle including the forward axle, and the draft appliances having coupling portions at their terminals, of socket devices comprising vertical apertured ears and resilient horizontal plates, the coupling portion of the draft appliances bearing against said ears and upon said resilient plates, means for connecting said sockets to said axle, tubular members, means for connecting said tubular members to said axle, bolts extending through said tubular members and adapted to be projected through said coupling portions of the draft appliances and through said apertured ears, jointed rods pivotally united at their adjacent ends and likewise pivotally united at their outer ends to the inner ends of said bolts, and means for operating said jointed rods to withdraw said bolts and release the draft appliances.

2. The combination with a vehicle including the forward axle and the draft appliances having coupling members at the terminals thereof, of socket devices attached to said axle, the coupling portions of the draft appliances engaging said sockets, tubular members having detachably apertured caps at the ends, bolts extending through said tubular members and through said caps and adapted to engage at one end through the coupling portions of the draft appliances, springs within said tubular members and operating to maintain said bolts yieldably in projected position, clip plates bearing beneath said axle and with projected portions enclasping said tubular members, means for connecting said clip plates to said axle, and means for withdrawing said bolts to release said draft appliances.

3. The combination with a vehicle including the running gear and body, and the draft appliances having terminal coupling devices, of sockets for the coupling devices carried by the forward axle, bolts spring supported and operating through said coupling devices, jointed rods pivotally united at their adjacent ends and also pivotally united to the inner ends of said bolts, a lever pivoted to said body, a rod between said lever and said jointed rods, and a lock device operating to hold said lever from operation.

4. The combination with a vehicle including the running gear and body, and the draft appliances having terminal coupling devices, of sockets for the coupling devices carried by the forward axle, bolts spring supported and operating through said coupling devices, jointed rods pivotally united at their adjacent ends and also pivotally united to the inner ends of said bolts, a lever pivoted to said body, a rod between said lever and said jointed rods, a lock device operating to hold said lever from operation, and a safety spring operating to hold said lever from operation when said locking device is released.

5. The combination with a vehicle including the running gear and body, and the draft appliances having terminal coupling devices, of sockets for the coupling devices carried by the forward axle, bolts spring supported and operating through said coupling devices, jointed rods pivotally united at their ends to the inner ends of said bolts, a lever pivoted to said body, a rod connected at one end to said lever and extending beneath the forward axle and directed forwardly and forming a pivot uniting the adjacent ends of said jointed rods.

6. The combination with a vehicle including the running gear and body and the draft appliances having terminal coupling devices, of sockets for the coupling devices carried by the forward axle, bolts spring supported and operating through said coupling devices, jointed rods pivotally united at their outer ends to the inner ends of said bolts, a lever pivoted to said body, a rod connected at one end to said lever and extending beneath the forward axle and directed upwardly and forming a pivot uniting the adjacent ends of said jointed rods, guard devices carried by said forward axle and extending above and below said rod, and a guard carried by the running gear rearwardly of the forward axle and beneath which the rod extends.

7. The combination with a vehicle including the running gear and body, and the draft appliances having terminal coupling devices, of sockets for the coupling devices carried by the forward axle, bolts spring supported and operating through said coupling devices, jointed rods pivotally united at their outer ends to the inner ends of said bolts, a lever pivoted to said body and provided with a vertical loop at its lower end, a rod movably engaging said loop at one end and passing beneath the axle and directed upwardly and forming a pivot uniting the adjacent ends of said jointed rods, guard devices carried by said forward axle and extending above and below said rod, and a guard carried by the running gear rearwardly of the forward axle and beneath which the rod bears.

8. The combination with a vehicle including the running gear and body, and the draft appliances having terminal coupling devices, of sockets for the coupling devices carried by the forward axle, bolts spring supported and operating through said coupling devices, jointed rods pivotally united at their adjacent ends and also pivotally united to the inner ends of said bolts, a lever pivoted to said body, a rod between said lever and said jointed rods, and a lock lever pivoted intermediate its ends to said body and engaging said lever at one of its ends.

In testimony whereof, I affix my signature, in presence of two witnesses.

GEORGE W. BARNETT.

Witnesses:
GEO. G. NOLEN,
C. H. DOCKERY.